United States Patent

[11] 3,566,143

| [72] | Inventors | T. O. Paine<br>Administrator of the National Aeronautics and Space Administration in Respect to an Invention of;<br>Arnold S. Cherdak, Somerset; James L. Douglas, Hightown, N.J. |
|---|---|---|
| [21] | Appl. No. | 806,226 |
| [22] | Filed | Mar. 11, 1969 |
| [45] | Patented | Feb. 23, 1971 |

[54] MAXIMUM POWER POINT TRACKER
10 Claims, 6 Drawing Figs.

[52] U.S. Cl. .................................................. 307/126, 323/20
[51] Int. Cl. .................................................. H01h 47/00
[50] Field of Search ........................................ 307/33, 60, 61, 63, 126; 219/485, 497, 110; 320/32, 33, 40; 323/20; 321/19

[56] References Cited
UNITED STATES PATENTS

| 2,992,365 | 7/1961 | Brill .......................... | 307/126X |
| 3,300,712 | 1/1967 | Segsworth .................. | 219/497X |
| 3,356,930 | 12/1967 | Lupoli et al. ................ | 323/20 |
| 3,391,322 | 7/1968 | Findley, Jr. et al. ......... | 321/2 |
| 3,414,774 | 12/1968 | Motta ......................... | 323/20X |
| 3,421,015 | 1/1969 | Jones et al. .................. | 307/126X |

Primary Examiner—Robert K. Schaefer
Assistant Examiner—H. J. Hohauser
Attorneys—R. F. Kempf, E. Levy and G. T. Mc Coy ABSTRACT: Apparatus for detecting the instantaneous power from a power source and operatively selectively disconnecting the power source from a load and a battery recharging circuit upon generation of a pulse from a power peak detector or a peak absence detector, power to the load being supplied by the battery when the power source is disconnected, battery overcharged protection controls further operating to override reset of the power switch, the power source being forced to supply a range of output voltage corresponding to that providing maximum power output of the source.

INVENTORS
ARNOLD S. CHERDAK
JAMES L. DOUGLAS

ATTORNEYS

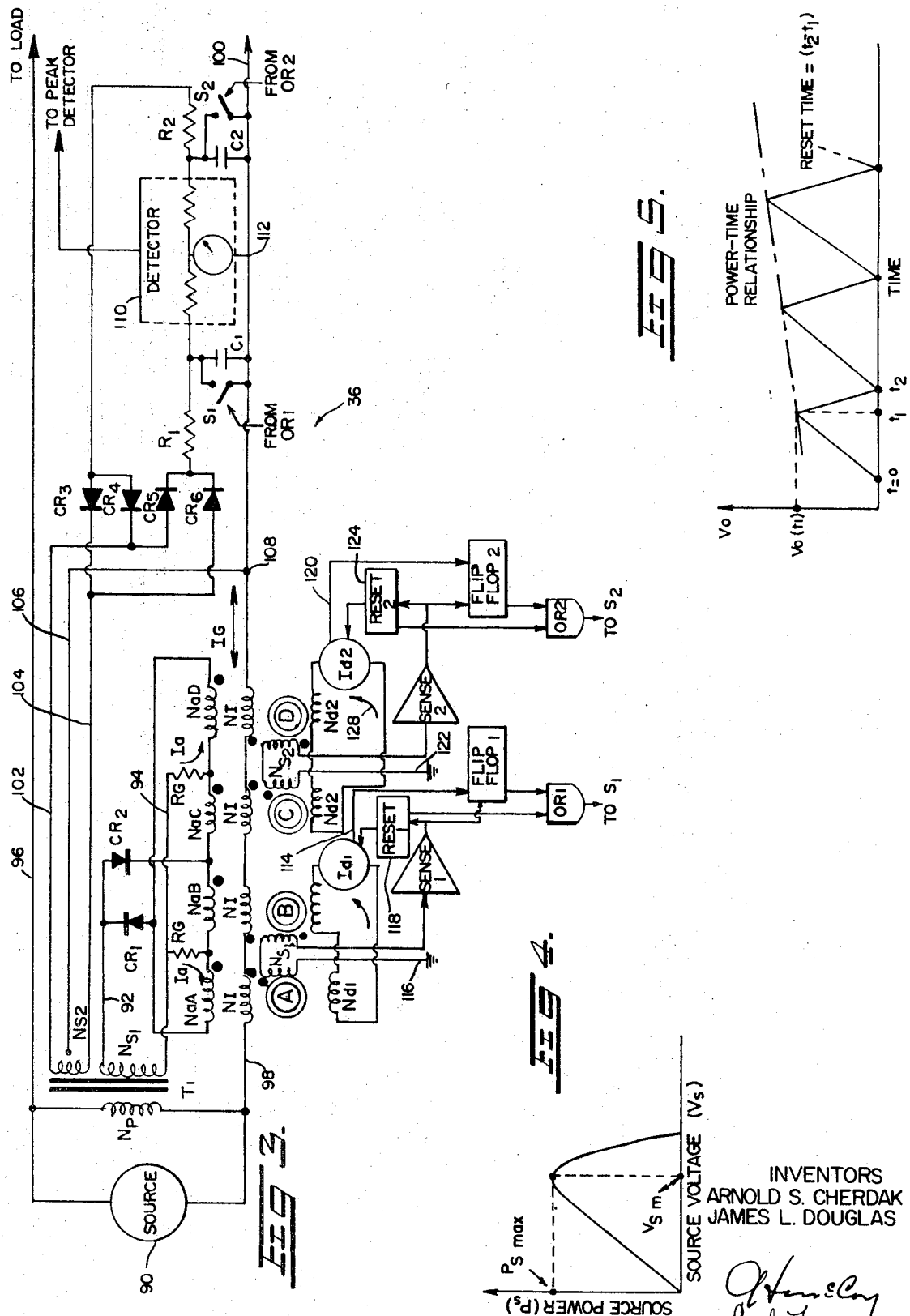

3,566,143

1

MAXIMUM POWER POINT TRACKER

The invention described herein was made in the performance of work under a NASA contract and is subject to the provisions of Section 305 of the National Aeronautics and Space Act of 1958, Public Law 85–568 (72 Stat. 435; 42 USC 2457).

The present invention relates to a power point tracker, and more specifically, to apparatus for operatively maintaining the output voltage of a power source within a range corresponding to the maximum power output thereof.

The invention is adapted to be coupled to any power source supplying a resistance-reactance load and wherein at some point within the range of output voltages supplied by the source maximum power is derived. According to a preferred embodiment of the invention, a power source as described is coupled through a power switch to a resistance-reactance load and a recharge circuit connecting a voltage source comprising a battery. A voltage sensor and a current sensor is operatively coupled to the source and supplies a multiplier which gives an indication of instantaneous power from the source. The output of the multiplier is supplied to a peak detector which supplies a pulse to an OR gate whenever a peak in the instantaneous power is detected. A pulse absence detector additionally is supplied by the peak detector and provides a pulse to the OR gate in the absence within a specified time interval of a pulse from the peak detector. The pulse output from the OR gate operates a bistable flip-flop wherein one of the active states operates a driver mechanism to open the power switch. In the other stable state, the driver is operated to close the power switch. By alternatively opening and closing the power switch, the power source is forced to supply a range of voltages to the load and battery recharge circuits corresponding to that at which maximum power is derived.

The invention is further directed to battery overcharge protection controls which operate to override the signal from the flip-flop and operate the driver mechanism to open the power switch when a dangerous condition in the batteries is detected.

The invention is further more particularly directed to a power sensing mechanism for detecting the instantaneous power of a DC source or an AC source, thereby enabling adaptation of the invention to control power output from any type of voltage source.

Accordingly, it is an object of the invention to provide apparatus for controlling the output voltage of a power source within a range of values corresponding to that at which maximum power is derived.

Another object of the invention is to provide apparatus for supplying maximum power output to a resistance-reactance load from an AC or DC source.

A further object of the invention is to provide apparatus for detecting the instantaneous power output of either an AC or DC source.

Yet another object of the invention is to provide apparatus for controlling the maximum power output from an AC or DC source supplying a resistance-reactance load and recharge circuits of a battery, battery overcharge protection controls being provided to override the power control apparatus in response to excessive power being supplied to the battery overcharge circuit.

Other objects and many attendant advantages of the present invention will become apparent upon a perusal of the following detailed description taken in conjunction with the accompanying drawings wherein:

FIG. 3 is a schematic diagram of an instantaneous power detector circuit forming a part of the invention as illustrated in FIG. 1;

2

Figure 6:
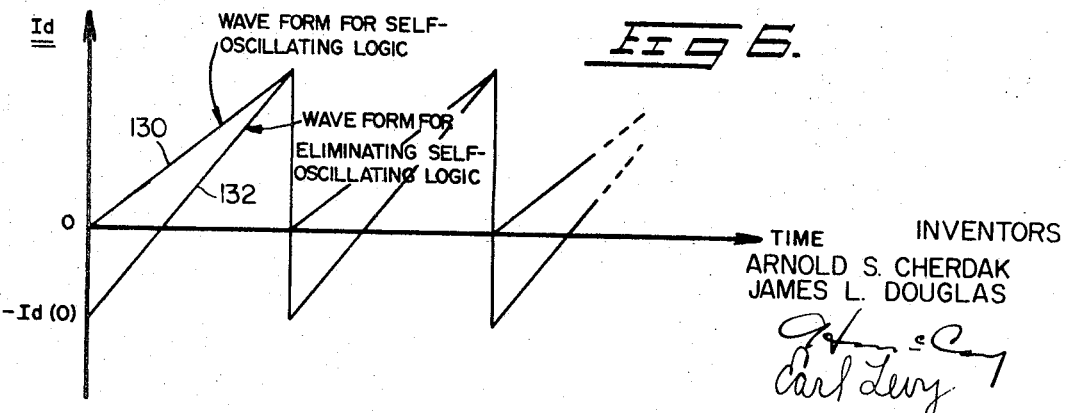

FIG. 4 is a graphic representation of voltage versus power characteristics of a power source to which the invention is adapted;

FIG. 5 is a graphic representation of the output voltage versus time of the instantaneous power detector as illustrated in FIG. 3; and FIG. 6 is a graphic representation of the output of a sawtooth oscillator of a modified embodiment of the apparatus as illustrated in FIG. 3 for eliminating the self-oscillating logic thereof.

Figure 1:
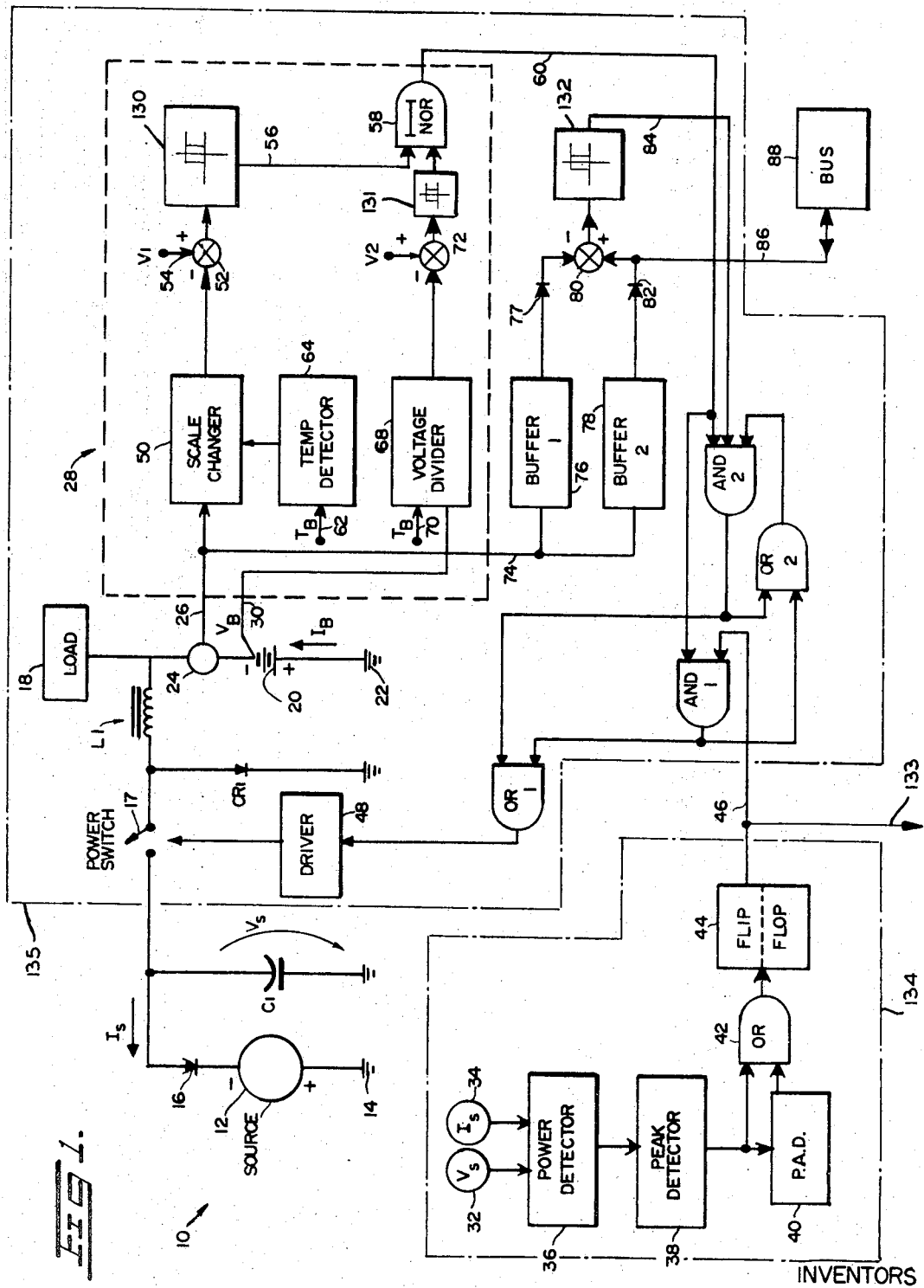
FIG. 1 is a functional schematic diagram of the maximum power point tracker according to the invention.

With more particular reference to the drawings, there is shown in FIG. 1 a maximum power point tracking system generally indicated at 10 according to the invention. A power source 12 is connected with its positive output to ground as indicated at 14. A diode 16 is provided in series with the source to prevent reverse flow of current therethrough. A capacitor C1 is connected in parallel with the source for a purpose to be hereinafter explained. A power switch 17 connects the source and the capacitor to a resistance-reactance load indicated by the inductor L1 and the remaining portion 18 which may comprise resistance-reactance electrical apparatus to be supplied by the source 12. The details of the load 18 will not be described since it forms no part of the invention.

Coupled to ground between the power switch and the inductor L1 is a diode CR1. At the junction of the load 18 and the inductor L1 is a battery 20 connected with its positive to ground at 22. A sensor 24 is connected between the battery 20 and the junction of the load 18 and the inductor L1. The sensor 24 detects the instantaneous battery current, indicated by $I_b$ and the accompanying arrow, and transmits the same over a conductor 26 to a battery overcharge protection control indicated generally by the dotted line enclosure 28. Additionally, a conductor 30 is schematically provided in the figure adjacent to the negative terminal of the battery 20 for transmitting the instantaneous voltage designated by $V_B$ to the control 28. The above-described structure comprises a power source operatively coupled through a power switch to a resistance-reactance load and a battery charge circuit. The source may be of any type characterized by the source power $P_S$ versus source voltage $V_S$ which will result in the graph illustrated in FIG. 4 wherein the maximum power $P_{S max}$ occurs between the maximum and zero output voltage of the source. As is well known in the prior art such characteristics are common to any power source which has an internal impedance. In the preferred embodiment as illustrated in FIG. 1, a DC source is utilized. However, as will be explained hereinafter the invention is suited for adaptation to an AC as well as a DC source.

With reference to FIG. 1, there is illustrated schematically a source voltage $V_S$ sensor 32 and a source current $I_S$ sensor 34 illustrated schematically. The output from the sensors 32 and 34 are supplied to a power detector illustrated schematically at 36, which detector is supplied for detecting the instantaneous power of the source. The peak detector output is in pulse form and is supplied both to a pulse absence detector 40 and an OR gate 42. An output in pulse form from the pulse absence detector 40 is also supplied to the OR gate 42. The output of the OR gate in response to a pulse from either detectors 38 and 40 operates a bistable flip-flop 44. In one stable state the flip-flop supplies an output, for example, over the conductor 46 to the gate $AND_1$. The output therefrom is supplied to the gate $OR_1$. From there a pulse is supplied to the driver 48 which operates to close or reset the power switch 17, thereby connecting the source 12 to the load 18, the inductor L1 and the battery 24 for recharge thereof. In response to a pulse from the OR gate 42, the flip-flop 44 in its second stable state suppresses generation of a pulse over the conductor 46, thereby permitting the driver 48 to open the power switch 17 and disconnect the source 12.

With reference yet to FIG. 1, the operation of the apparatus thus far described will be explained in detail. With the power switch 17 closed, the voltage across the inductor L1 is equal to the voltage of the battery $V_B$ minus source voltage $V_S$. The diode CR1 is reverse biased to prevent a current shunt therethrough. With the power switch closed, current will build up in the inductor L1 and power is supplied for charging the battery by the flow of current $I_B$ through the battery.

The capacitor C1 which is connected in parallel with the source 12 is discharged through the closed power switch 17 thereby causing decrease of the voltage $V_S$ thereacross. Accordingly, with reference to the graph of FIG. 4, the source voltage $V_S$ will decrease thereby retracing in a reverse direction along the illustrated power versus voltage curve and at some time will pass the intersection of $P_{Smax}$ and $V_{Sm}$. Accordingly, the point of maximum power output from the source 12 is approached and traversed. As the maximum power point is traversed a peak output from the instantaneous power detector 36 is supplied to the peak detector 38. Accordingly, the detector 38 supplies a pulse through OR gate 42 to activate the flip-flop 44 to its inactive stable state, thereby permitting the driver 48 to open the power switch 17 momentarily.

With the power switch open, the capacitor C1 is again charged by the source to build up the value of $V_S$. Simultaneously, the inductor L1 will then supply current through the now forward biased diode CR1, thereby causing a flow of current through the loop provided by the battery 20, the inductor L1 and the diode CR1. The battery 20 supplies a required source of power to the load 18.

With reference to FIG. 4, when the source 12 is recharging the capacitor C1, the source voltage $V_S$ increases and thereby traverses forwardly along the power versus voltage curve, again approaching and traversing the $P_{Smax}$ maximum power point. Again, the instantaneous output from the power detector 36 will provide a peak signal to the peak detector 38 and thereby provide a biasing signal to the OR gate 42 and the flip-flop 44. The flip-flop 44 will be actuated to its active state permitting a pulse signal to be sent over the conductor 46 to the driver 48 as described whereby the power switch 17 is again closed. Accordingly, by opening and resetting the power switch to a closed position the source 12 is controlled to supply a select range of voltages to the load 18, which range of voltages correspond to the maximum power output of the source 12. The pulse absence detector 40 is specifically provided to provide a signal to the flip-flop in the absence within a specified time interval of a pulse from the peak detector 38. Accordingly, should the required absence of a pulse from the detector 38 occur, the pulse absence detector 48 will provide an output pulse through the OR gate 42 to bias the flip-flop 44 into one of its stable states, thereby preventing a prolonged delay of the power switch in either its open or reset position.

OVERCHARGE PROTECTION

With further reference to FIG. 1, the schematically illustrated battery overcharge protection control 28 will be further explained in detail. The instantaneous current $I_B$ of the battery is detected by the sensor 24 and a proportional signal is distributed via the conductor 26 to a current sensor scale changer 50. The output of the scale changer 50 is supplied to an algebraic summer illustrated schematically at 52. Also supplied to a terminal 54 of the summer 52 is a reference voltage v1. The battery current signal is algebraically summed with reference voltage V1 by summer 52 according to the signs indicated adjacent to respective inputs. Under normal operating conditions, the reference voltage V1 is of greater value than the output from the scale changer 50, the signal from the summer 52 thereby remaining positive.

Such signal is supplied to a level detector 130 with characteristics indicated in the FIG. 1. The level detector has as a characteristic, the property of a constant output for all positive input signals and a zero output for all negative input signals in excess of the thresholds or hysteresis band as indicated in the FIG.

Such signal is applied over conductor 56 to a negative NOR gate 58. Through the negative NOR gate 58 the positive signal is supplied along a conductor 60 to the $AND_2$ gate and the gate $AND_1$. Accordingly, so long as the gate $AND_1$ receives a positive signal from the negative NOR gate 58 via the conductor 60, the operation of the driver 48 by a pulse signal through the gate $AND_1$ from the flip-flop 44 will not be interfered with.

However, when the current sensor 24 produces a relatively large negative signal, indicating a dangerous high condition of the current $I_B$ through the battery 20, the output from the scale changer 50 will produce a negative output from the summer 52. Accordingly the output from the level detector 130 will be zero. Accordingly, the NOR gate 58 upon detection of the zero signal will shut down and no signal over the conductor 60 to the gate $AND_1$ will occur. Absent this signal, the output from the flip-flop 44 will not be detected by the driver 48. Accordingly, the driver 48 will be unable to close the power switch 17. Therefore, the battery overcharge protection control provides an override control preventing power to be supplied from the source 12.

TEMPERATURE PROTECTION

With further reference to FIG. 1, the temperature of the battery $T_B$ is detected by any well-known apparatus 62 and supplied to a high temperature detector 64. The temperature detector output is supplied to the scale changer 50. The output from the temperature detector 64 acts on the scale changer 50 in such a manner as to increase its output voltage for a given battery current sensor signal. The output from the scale changer will be supplied to the summer 52.

It is understood that the output from the scale changer 50 is in proportion to the corresponding deflection of a vane indicator (not shown) despite the particular scale in operation.

Additionally, the voltage $V_B$ of the battery 20 is supplied over a conductor 30, for example, to a voltage divider 68. A signal representative of battery temperature $T_B$70 is supplied to the voltage divider 68, such divider ratio being a function of temperature $T_B$. The voltage divider output is representative of the battery voltage modified by the battery temperature according to such function as is well understood. Such output is supplied to a summer illustrated schematically at 72. The summer 72 compares the voltage divider output with a reference voltage V2 in a manner similar to that attributed to summer 52. Under normal operating conditions the output from the summer 72 is of positive value and is supplied to the threshold detector 131 and then to negative NOR gate 58 in a manner similar to that attributed to threshold detector 130. However, if the voltage of the battery becomes dangerously large, the output from the voltage divider 68 will produce a negative signal from the summer 72, thereby preventing delivery of a positive signal from the NOR gate 58 and along the conductor 60. Thus the gate $AND_1$ will be shut down and accordingly provide an override to prevent closing of the power switch 17 by the driver 48.

CURRENT SHARING CONTROLS

Further, the output of $AND_1$ is supplied to the gate $OR_2$ and through the triple AND gate 2. Under certain conditions to be described, the AND 2 will produce an output to the OR 1 further insuring operation of the driver 48 providing an override for the opening of power switch 17 when the flip-flop 44 is biased to its inactive state. For example, for the use where a multiplicity of batteries and controls similar to that shown within broken lines 135 are connected with a source 12 and peak power sensing controls 134, the battery current sensor 24 supplies a signal along a conductor 74 to a pair of buffer amplifiers 76 and 78 to facilitate a current charge sharing control between the batteries. The buffer 76 provides a signal through a diode 78 to a summer 80. The buffer 78 provides a signal through a diode 82 to the summer 80. Bus 88 is additionally provided along a conductor 86 to summer 80. Buffer amplifiers and diodes similar to buffer 78 and diode 82 for each of said multiplicity of batteries and controls are also connected to said conductor 86. The additional power switches and drivers are controlled via connection to conductor 133 in the manner described previously. This current sharing control operates to balance charging energy in each battery. The battery with the highest current will produce the highest current sensor output voltage and buffer output voltage. Then by the action of diodes 82, this sensor will determine the voltage on bus 88. The batteries and controls with lower currents will have outputs from summers corresponding to summer 80 which will be positive. This positive voltage when presented to a threshold detector similar to 132 will cause same to have a positive output.

If, then, the output of negative NOR gate 58 is positive thereby indicating safe operation of the battery 20 with regard to voltage, current and temperature, a positive signal from flip-flop 44 will result in a positive output from $AND_1$ into $OR_1$ and $OR_2$ gates. This will cause the power switch 17 to close and will cause a positive output from $AND_2$. The output from $AND_2$ will then be delivered to inputs of $OR_1$ and $OR_2$. When the flip-flop 44 output voltage falls to its zero state by the action of power detector 36, peak detector 38 and OR gate 42, the power switch 17 will remain closed by virtue of the output from $AND_2$. When the present battery current exceeds that in the battery with the "highest" current, the output of buffer 76 will exceed the bus 88 voltage whereupon the output of summer 80 will become negative and the output of threshold detector 132 will fall to zero. At this point, the output of $AND_2$ will reduce to zero thus causing driver 48 to reset the power switch 17.

In a system with a multiplicity of batteries and controls, this feature will then force a sharing of the charging power delivered from the source among the batteries. However, if a zero signal is supplied by the gate 58, indicating a dangerous condition, AND 2 and OR 2 will shut down to enable the required override provided by the battery protection control 28.

Figure 2:
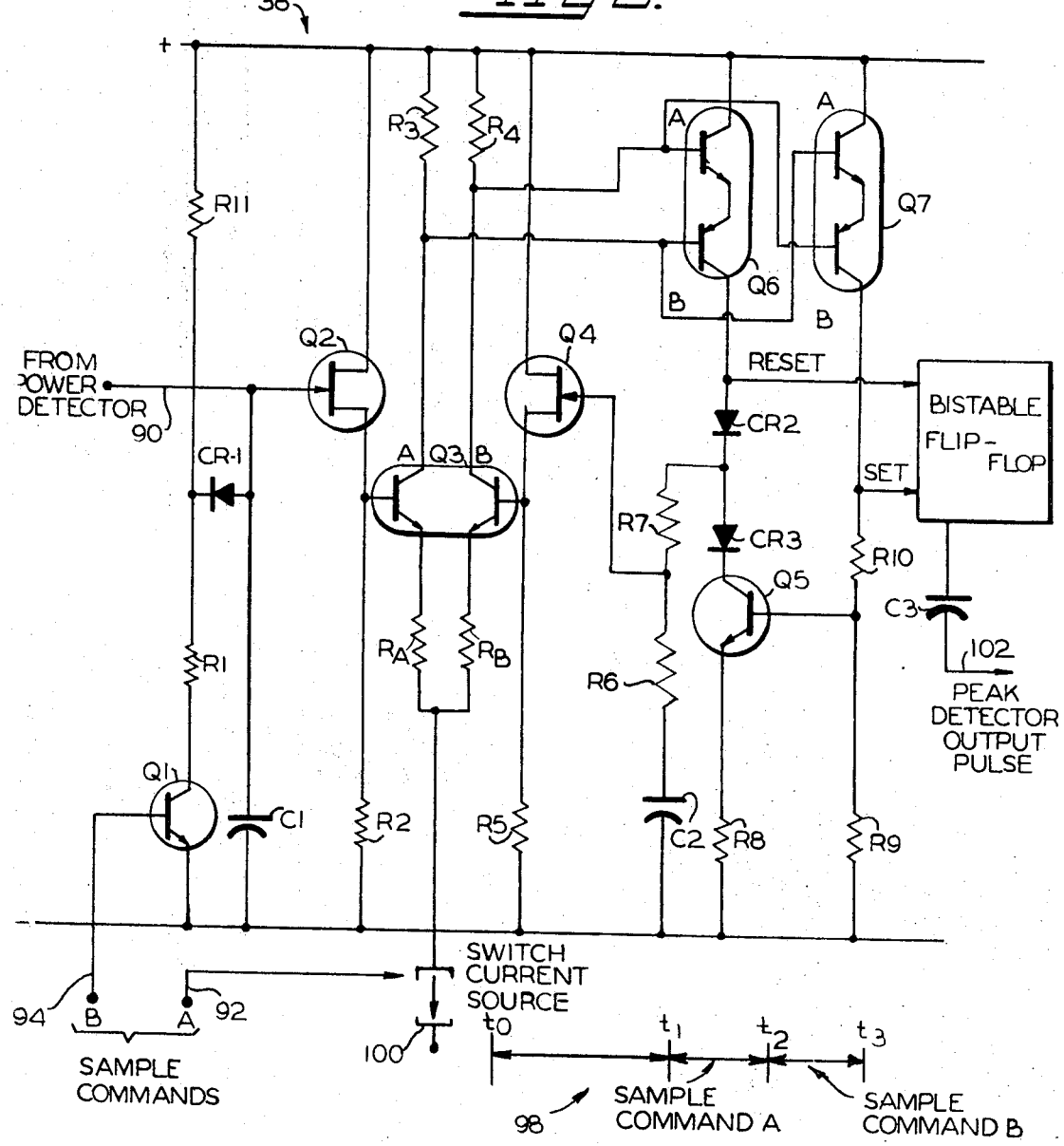
FIG. 2 is a schematic diagram of a peak power detector circuit forming a component of the invention as illustrated in FIG. 1.

With reference being made to FIG. 2, the particular details of the power peak detector 38 will be described. According to the FIG., a schematic representation of the power peak detector is illustrated generally at 38 and comprises a terminal 90 into which the output of the instantaneous power detector 36 is supplied. A pair of terminals 92 and 94 are supplied for receiving sample commands from the power detector logic. Such logic is not illustrated since it forms no part of the present invention. However, the logic provides a sampling signal to the terminals 92 and 94 according to the time intervals illustrated in the diagram generally indicated at 98. With reference to the diagram, during the time interval from $t_0$ to $t_3$, the peak detector 38 is caused to operate and receive an input over the terminal 90 from the instantaneous power detector 36. Over the time interval from $t_0$ to $t_1$, no sample commands are supplied to either of the terminals 92 and 94. However, during the time interval from $t_1$ to $t_2$, a signal from the power detector logic sends a sample command signal A over the terminal 92. Over the time interval from $t_2$ to $t_3$, the logic supplies a sample command B over the terminal 94. The logic then recycles beginning at time $t_0$ the time interval between $t_0$ and $t_1$ indicating a time delay to strictly segregate a following set of sample command signals A and B from previous ones.

For example, the entire sampling time cycle from $t_0$ to $t_3$ may comprise 5 microseconds. The sample command A supplied to the terminal 92 operates a switch current source indicated schematically at 100, which source provides a required bias current to turn on or off a difference amplifier Q3 illustrated in the FIG. Capacitors C1 and C2 are supplied as memory devices for storing instantaneous source power information supplied over the terminal 90. A pair of field effect transistors Q2 and Q4, together with a plurality of diodes CR1, CR2 and CR3 are provided in the circuit as shown to maintain a high circuit impedance in order to prevent undesired discharge of the capacitors C1 and C2. A pair of transistors Q1 and Q5 are provided in the circuit as shown to discharge the capacitors C1 and C2 at the appropriate time in the operating sequence as shown in the diagram 98.

Assume initially that capacitors C1 and C2 are discharged and that transistors Q1, Q3, Q5, Q6 and Q7 as well as the current source 100 are turned off. At the time $t_0$, the source power is assumed to increase whereby an input voltage over the terminal 90 charges the capacitor C1 over the time interval from $t_0$ to $t_1$. At the same time $t_1$, the sample command A is received from the power detector logic (not shown) whereby the switch current source 100 is turned on to provide the required bias current for the difference amplifier Q3.

At the moment of turn on, difference amplifier Q3 is unbalanced due to the voltage stored on the capacitor C1 being greater than that on the capacitor C2. The complementary difference amplifier Q6 is thereby caused to conduct, permitting the capacitor C2 to charge until its stored voltage equals that stored on capacitor C1. Upon such voltage equalization, the amplifier Q3 is restored to balance. The source power information is thereby transferred from the capacitor C1 to the capacitor C2 which acts as a memory element.

When the amplifier Q6 is caused to conduct, such is an indication that an increase in source power is detected, and an input signal is provided along the reset terminal to bias a bistable flip-flop to its reset conditions. At the time $t_2$, the sample command A is extinguished, turning the difference amplifier Q3 off, via the switch current source 100. Also at the time $t_2$, the sample command B is applied to the terminal 94 thereby turning on the discharge transistor Q1 which operates to discharge the capacitor C1 in preparation for a following set of sampling signals occurring in a subsequent time interval.

At the same time $t_3$, the power detector logic (not shown) extinguishes the sample command B and the sampling cycle is restarted beginning at the time $t_0$. If the sampled source power continues to increase during each subsequent sampling interval, the operation of the peak detector 38 will operate as described.

However, assume that the source power decreases during a sampling interval. Thus, at the time $t_1$, the capacitor C1 will be charged to a voltage which is less than that previously stored on the capacitor C2. The sample command A will turn on the difference amplifier Q3 which is unbalanced in the opposite direction, causing a complementary difference amplifier Q7 to conduct rather than the amplifier Q6. This action turns on the discharge transistor Q5 which discharges the capacitor C2. When the capacitor C2 is discharged to the voltage level equal to that of the capacitor C1, the amplifier Q3 is restored to a balanced condition. Simultaneously, the transistor Q7 is turned on to provide a "set" input signal to the bistable flip-flop which issues a peak detector output pulse as indicated over the output terminal 102. The remaining operation of the circuit over the time interval $t_2$ to $t_3$ is as previously described for the condition of increasing source power. The peak detector 38 will not be responsive to further decreases in the detected source power until a source power increase is detected to reset the bistable flip-flop. Accordingly, the bistable flip-flop is provided for eliminating erroneous peak detector output pulses which can occur, for example, as the result of a source power phase lag. Accordingly, the peak detector 38 is illustrated in FIG. 2 provides a relative power level comparison and either information storage or peak detection within a 5-microsecond sampling interval.

With more particular reference to FIG. 3 of the drawings, a specific embodiment of the instantaneous power detector 36 is illustrated and described more in detail as follows. Whereas in FIG. 1 the illustrated power source 12 is a DC type, the power detector 36 to be described is adaptable to detection of instantaneous power of an AC source as well. Accordingly, with reference to FIG. 3, an AC source is illustrated at 90, which source may be substituted for the source 12 of FIG. 1 in the well-known manner. Connected in parallel with the source is a transformer T1 with primary windings $N_P$ and secondary windings $N_{S1}$ and $N_{S2}$. The output from the secondary winding $N_{S1}$ are rectified through appropriate diodes CR1 and CR2 for controlling the appropriate direction of current flow. More specifically, a conductor 92 connects one end of the secondary windings $N_{S1}$ to the junction of the oppositely directed diodes CR1 and CR2. The diodes CR2 is connected to the junction of inductors $N_{ab}$ and $N_{ac}$. The diode CR1 is connected to the junction of inductors $N_{aA}$ and $N_{aD}$. A first resistor $R_G$ is connected to the junction of the inductors $N_{aA}$ and $N_{aB}$. A second resistor $R_G$ is connected to the junction of the inductors $N_{aC}$ and $N_{aD}$. The junction of the first and second resistors $R_G$ is connected by a conductor 94 to the other side of the windings $N_{S1}$. The diode CR1 connects the junction of the inductors $N_{aA}$ and $N_{aD}$ to the conductor 92. One side of the primary windings $N_P$ is connected to a conductor 96 which as illustrated in FIG. 3, is connected to the load, for example, through the power switch 17 as illustrated in FIG. 1. The other side of the primary windings $N_P$ is connected by a conductor 98 to a plurality of windings $N_I$, each of the windings $N_I$ being associated respectively with the windings $N_{aA}$, $N_{aB}$, $N_{aC}$ and $N_{aD}$. The conductor 98 terminates at 100 which may be connected to ground potential. The secondary windings $N_{S2}$ is provided with outer conductors 102 and 104 and a central conductor 106. The central conductor 106 is connected to a junction 108 which is at common potential with the terminal 100 of the conductor 98. The outer conductor 102 is connected to a diode CR5 and the conductor 104 is connected to a diode CR6. A resistor $R_1$ connects the junction of the diodes CR5 and CR6 to one side of a reset switch network comprising in parallel a reset switch S1, a capacitor C1 and a voltage detector 110 which circuit is connected to ground, for example at 112. The detector is in parallel with another reset switch circuit comprising in parallel a reset switch S2, a capacitor C2 and the detector 110 connected to ground at 112. A resistor R2 connects the S2 reset switch circuit to a pair of diodes CR3 and CR4. The diode CR3 is connected to the conductor 104 and the diode CR4 is connected to the conductor 104, thereby completing the circuit associated with the secondary windings $N_{S2}$.

With further reference to FIG. 3, a first magnetic core A is associated with the windings $N_{aB}$ and $N_I$. In similar fashion a magnetic core B is associated with the inductors $N_{aB}$ and $N_I$ and a magnetic core D is associated with the windings $N_{aD}$ and $N_I$.

A first sawtooth current oscillator $I_{d1}$ is provided with a closed loop circuit comprised of excitation windings $N_{d1}$ associated with the magnetic core A and excitation windings $N_{d1}$ associated with the magnetic core B. Another output of the sawtooth generator $T_{d1}$ is conveyed by a conductor 114 to a bistable flip-flop No. 1, the output of which is supplied to an OR gate No. 1. The magnetic cores A and B are provided with magnetic direction sense windings $N_{S1}$. One side of the windings $N_{S1}$ is connected to ground potential at 116 and the other end is connected to a sense amplifier No. 1. The output of the sense amplifier 1 is supplied both to a reset circuit 118 and the bistable flip-flop No. 1. The output of the reset circuit 118 is supplied back to the generator $I_{d1}$ and to the OR gate No. 1.

In similar fashion, the magnetic cores C and D are provided with excitation windings $N_{d2}$, respectively, which are in a closed loop excitation circuit having a sawtooth current generator $I_{d2}$. The generator $I_{d2}$ is provided with an output conductor 120 which supplies a bistable flip-flop No. 2. The output from the flip-flop No. 2 supplies an OR gate No. 2. The output of the OR gate 2 operates to close the reset switch S2. Upon cessation of an output from the OR gate the switch S2 will open.

Additionally, the magnetic cores C and D are provided with magnetic field direction sense windings $N_{S2}$, one side of which is connected to ground potential at 122, and to the other side of which is connected to a sense amplifier No. 2. The output of the sense amplifier 2 is supplied both to the flip-flop No. 2 and a second reset circuit 124. The output of the reset circuit 124 is supplied back to the generator $I_{d2}$ and to the OR gate No. 2.

In operation of the instantaneous power detector 36, reference will be made specifically to the operation of the magnetic core A. Assume that the reset switch S1 is opened by a reset signal from the reset circuit 118 through the OR gate No. 1 and that the circuit 118 further initiates operation of the $I_{d1}$ generator. Assume further that the source 90 produces a current $I_G$ in a direction horizontally left through the inductors $N_I$. The $I_{d1}$ generator is a sawtooth waveform generator, the output of which produces a progressively increasing magnetic field intensity in the magnetic core A opposite in direction to the corresponding magnetic field created by the flow of current $I_G$.

The resultant magnetic core field intensity becomes the algebraic addition of the oppositely directed fields. Accordingly, the resultant field intensity is initially negative due to the current $I_G$. Subsequently, the resultant field intensity becomes positive due to the increasing positive current in the windings $N_{d1}$ produced by the sawtooth generator.

Due to the positive resultant field, a voltage is induced in the sense windings $N_{S1}$. As the voltage attains a predetermined positive value, the output thereof through the sensing amplifier No. 1 is supplied to the reset circuit which initiates a pulse through the OR gate No. 1 to momentarily close the reset switch S1 and thereby discharge the capacitor C1 to zero voltage. Further an output signal from the reset circuit 118 is supplied to turn off the current generator $I_{d1}$. For example, the $I_{d1}$ generator is a current sawtooth oscillator, the maximum current amplitude of which is that of the maximum expected rated current $I_G$ times $$\frac{NI}{Ndl}.$$

Further, the generator is provided with a self-oscillation circuit. More specifically, when the current $I_G$ is zero, of the wrong sign or in excess of rated, a self-oscillation indication is generated and conveyed over the conductor 114 to the flip-flop No. 1. The output of the flip-flop provides a signal to the OR gate and biases the reset switch S1 to a closed position thereby forcing discharge of the voltage across the detector 110 to zero.

The voltage, $V_o$, is the output of the indicated $R_1$ - $C_1$ network and may be expressed in terms of the Laplace transform after the reset switch S1 is opened at $t=0$ as:

(1.) $$V_0(s) = \frac{V_G(s)}{1+SRC_{11}}$$

In the time domain (considering $V_G$ constant over the sampling interval).

(2.) $$V_0(t) = V_G(1 - e^{-t/RC_{11}})$$

For period of time, $t_1$, much smaller than the time constant, $RC_{11}$, results in the linear approximation, (3.) $$V_0(t=t_1) = \frac{V_G t_1}{RC_{11}}$$

If the remaining circuitry, indicated in FIG. 3 satisfies the relationship, (4.) $$t_1 = K_1 I_G,$$
then (5.) $$V_0(t=t) = \frac{V_G}{RC_{11}} KK = \frac{K_1}{RC_{11}} P_G$$

where
$K_1$ is a proportionality constant.
$P_G$ is the source power to be measured.
$t_1$ is the time at which reset circuit action occurs.

With reference to FIG. 5, the output voltage across the detector 110 is shown vs. time. The dashed line in FIG. 5 represents the sensed Power-time relationship. If (6.) $(t_2 - t_1) << t_1$, then the average voltage also is proportional to the power which indicates that an ordinary, average reading voltmeter may be employed as the detector 110.

The circuit as described thus far is sufficient for detecting at the detector 110 the instantaneous power of a DC source. However, if the source 90 as described is an AC type, a second magnetic core B must be provided for detecting through its windings $N_1$ the effects of source current $I'_G$ in a direction to the right. Thus, the above-explained operation of the circuits associated with the magnetic core A applies as well to the operation of the core B, except that the magnetic field is produced by an opposite flow of current. Accordingly, with the core A sensing a current flow $I_G$ to the left and core B sensing current flow to the right, the instantaneous power output of the AC source 90 is detected.

To measure the average power in the AC circuit, the additional windings $N_{aA}$, $N_{aB}$, $N_{AC}$ and $N_{aD}$, are associated with a respective one of the magnetic cores A, B, C and D in order to effectively cancel the field effects created by the appropriate $I_{d1}$ and $I_{d2}$ generator for given conditions as follows.

Consider the case wherein the instantaneous source polarity is indicated by the direction of current $I_a$ in the FIG. 3. For this case, the half-cycle of the AC source 90 under consideration is identified by that cycle wherein the instantaneous flow of current $I_G$ is reversing, as typically occurring when the source is supplying a resistance-reactance load. With the current $I_G$ initially flowing in a direction to the left through the windings $N_I$, the following occurs.

The current $I_a$ flows in the conductors $N_{aA}$ and $N_{aD}$ of the cores A and D as indicated in the FIG. Thus, if the current $I_{d1}$ and $I_{d2}$ are flowing through the windings $N_{d1}$ and $N_{d2}$ in the directions as indicated by the arrows 126 and 128, no sense indications from the cores A and D will occur in either the sense amplifier 1 or the sense amplifier 2.

The current $I_G$ through the windings $N_I$ and the current $I_{d2}$ through the windings $N_{d2}$ have the same polarity relative to the created field excitation of the magnetic core C. Thus no sense indications to the sense amplifier 2 will occur. Accordingly, the $I_{d2}$ generator will run to completion in its self-oscillating mode and will trigger the flip-flop 2 which will hold the reset switch 52 closed until a sense pulse from the reset circuit 124 opens the switch and initiates operation of the generator $I_{d2}$. Accordingly, zero voltage will be maintained across the capacitor C2, for the duration that the switch S2 is closed.

However, the current $I_G$ through the windings $N_I$ and the current $I_{d1}$ through the windings $N_{d1}$ will be of opposite polarity with respect to the field excitations of the core B. The result is the appropriate condition for indication of a voltage by the detector 110. Since the voltage seen by the detector 110 is proportional to the power, such voltage is transferred from the detector 110 to the peak detector which samples the voltage within the time interval $t_0$ to $t_3$ as heretofore explained in conjunction with FIG. 2.

With reference yet to FIG. 3, the operation of the instantaneous power detector circuit 36 will be further explained. When the current $I_G$ reverses its direction of flow, the magnetic cores A and D are still gated out of sensing operation by the effects of the current $I_A$ still flowing in the direction as shown in the drawing due to a phase difference between the voltage induced in the secondary windings $N_{S1}$ and the current $I_G$. The field excitations in the magnetic core B will be in the same relative direction because the excitations created by the currents $I_G$ and $I_{d1}$ will be in the same relative direction so that no field excitation change will be detected by the sense amplifier No. 1. However, the field excitations for the magnetic core C will experience a sense change and the output from the sense amplifier No. 2 in response thereto is supplied to the flip-flop No. 2 and through the OR gate No. 2 to bias the switch S2 to an open position thereby causing a voltage to appear across the capacitor C2 which voltage is detected by the detector 110.

When the source voltage reverses again, the field excitations of the cores A and D will experience a sense change and the output from the sense amplifier No. 1 in response thereto will activate the flip-flop No. 1 and accordingly will open the switch S1. A voltage will thus appear across the capacitor C1 which voltage is detected by the detector 110.

Whereas the voltage across the capacitor C1 will produce a positive upscale indication on the detector 110, a voltage across the capacitor C2 will produce a downscale indication. Accordingly, the detector utilized in practice is an average reading device such as a D'Arsonval-type meter with a zero at center scale. In practice, the voltage variations produced alternately across the capacitors C1 and C2 are of sufficient rapidity to produce a steady deflection on the meter.

As an added feature of the circuit as illustrated in FIG. 3, the phase of the voltage relative to the current may experience a 180° phase lag causing a D'Arsonval-type indicator to deflect in a reverse direction with the magnitude of the deflection remaining the same. This feature allows an indication of the direction as well as the magnitude of the power flow through the meter. This has particular application to the situation where the source is an AC bus supplied by a plurality of AC sources, the power sensor therefore monitoring the bus contribution of one or more sources.

The preferred embodiment of the detector 36 as illustrated in FIG. 3 may easily be modified to eliminate the need for the self-oscillating feature of the sawtooth generators $I_{d1}$ and $I_{d2}$. More specifically, with reference to FIG. 6 there is shown a graphic representation of the current waveform output of each of the generators. As shown in the FIG., a graphic plot of generator current $I_d$ versus time is illustrated. A waveform of a typical sawtooth generator indicated at 130 has no negative component. However, by selecting the proper generators $I_{d1}$ and $I_{d2}$ having a substantial negative output waveform as illustrated at 132, the need for the self-oscillating features represented by the conductors 114 and 120 would be eliminated. For this case, the initial portion of the output current of the current generators would be sufficient to enable the magnetic cores A, B, C and D to detect a sense change for conditions of zero current $I_G$. Conditions of current $I_G$ in the wrong direction or of value in excess of rated would then result in an off scale indication of the detector 110. Accordingly, the condition for zero $I_G$ would result in a zero or minimum indication of the detector 110.

Other modifications and embodiments of the present invention may be made without departing from the spirit of the invention as recited in the appended claims.

We claim:

1. A maximum power point tracker for adaptation to control the operation of a power source, including: a voltage sensor and a current sensor operatively coupled to the power source, an instantaneous power detector connected to the current sensor and voltage sensor, a peak detector connected to the current sensor and voltage sensor, a peak detector connected to the power detector for detecting a peak value in the instantaneous power from the power source, an OR gate operatively coupled to the peak detector, a pulse absence detector connected between said peak detector and said OR gate, a bistable flip-flop connected to said OR gate, a power switch driver connected to the flip-flop, a power switch connecting said power source to a load, said flip-flop being actuated in one stable state to activate the power switch driver to close the power switch thereby connecting the power source to the load, said flip-flop being operable in another stable state to activate the power source driver and open the power switch, thereby disconnecting the power source from the load, whereby the power source is caused to supply said load with a range of voltages corresponding to that at which the maximum power output of the source occurs.

2. The structure of claim 1 wherein said instantaneous power detector comprises: a first magnetic core and a second magnetic core, first windings magnetically coupled to said first core and connected to said power source, second windings magnetically coupled to said second core and to said power source, a closed loop field excitation circuit magnetically coupled to said first and said second core, said excitation circuit including a waveform generator, magnetic field sense windings magnetically coupled to said first and said second core, a sense amplifier connected to said sense windings, a reset circuit and a bistable flip-flop connected to receive a signal from the sense amplifier, and OR gate operatively coupled to said reset switch and said flip-flop, said waveform generator being connected to receive a signal from said reset switch, a resistor and a capacitor connected to said first and second windings, a reset switch connected in parallel with said capacitor, and a voltage detector connected in parallel with said capacitor.

3. The structure of claim 2, wherein said waveform generator includes a sawtooth generator the waveform of which comprises negative and positive components.

4. The structure of claim 2, wherein said waveform generator supplies a self-oscillating signal to said flip-flop.

5. The structure of claim 2, and further including means coacting with said instantaneous power detector for average power detection comprising: third and fourth magnetic cores, third and fourth windings magnetically coupled to said third and fourth cores and said power source, a second closed loop excitation circuit magnetically coupled to said third and fourth cores, a second waveform generator in said second excitation circuit, second field sense windings magnetically coupled to said third and fourth cores, a second sense amplifier connected to said second sense windings, a second reset circuit and a second bistable flip-flop connected to said second sense amplifier, a second OR gate connected to said second reset switch and said second flip-flop, said second reset switch supplying a reset signal to said second waveform generator, a second resistor and a second capacitor connected to said third and fourth windings, and a second reset switch connected in parallel with said second capacitor, said voltage detector being connected in parallel with said second capacitor.

6. The structure of claim 5, wherein said second waveform generator includes a sawtooth generator the waveform of which includes negative and positive components.

7. The structure of claim 5, wherein said waveform generator supplies a self-oscillating signal to said flip-flop.

8. The structure of claim 1, and further including override control means operatively connected to said power switch driver for preventing the closing thereof.

9. The structure of claim 8, wherein said control means includes detectors for sensing excessive temperature, current and voltages of at least a portion of said load, and AND gate connected between said flip-flop and said power switch driver, said detectors normally supplying a "positive" signal to said AND gate, said positive signal being extinguished in response to excessive load temperature or current voltage to shut down said AND gate.

10. The structure of claim 8, wherein said control means includes detection of current imbalance among a plurality of connected battery systems and function to promote balance among battery currents.